United States Patent [19]

Henry

[11] Patent Number: 5,010,843
[45] Date of Patent: Apr. 30, 1991

[54] PET BED

[76] Inventor: Beth Henry, La Tierra Nueva, 1063 Buckman Rd., Santa Fe, N. Mex. 87501

[21] Appl. No.: 438,163
[22] Filed: Nov. 16, 1989
[51] Int. Cl.$^5$ .............................................. A01K 1/035
[52] U.S. Cl. ........................................ 119/28.5; 5/462
[58] Field of Search .................. 119/1, 19, 29; 5/419, 5/420, 437, 442, 462, 463, 434, 435, 436

[56] References Cited

U.S. PATENT DOCUMENTS

| | | | |
|---|---|---|---|
| 1,569,712 | 1/1926 | Burt | 119/1 |
| 2,032,248 | 2/1936 | Bins | 119/1 |
| 2,167,622 | 8/1939 | Bentivoglio | 5/338 |
| 2,775,222 | 12/1956 | Kruck | 119/1 |
| 2,952,856 | 9/1960 | Ruff | 5/437 |
| 3,842,454 | 10/1974 | Young | 5/343 |
| 3,902,456 | 9/1975 | David | 119/1 |
| 3,911,512 | 10/1975 | Plate | 5/465 |
| 3,989,008 | 11/1976 | Neumann | 119/1 |
| 4,008,687 | 2/1977 | Keys | 119/1 |
| 4,242,767 | 1/1981 | McMallen et al. | 5/437 X |
| 4,259,757 | 4/1981 | Watson | 5/434 |
| 4,393,530 | 7/1983 | Stark | 5/437 |
| 4,742,799 | 5/1988 | Schlitz | 119/29 |

FOREIGN PATENT DOCUMENTS 0117406 2/1901 Fed. Rep. of Germany .......... 5/437

Primary Examiner—Robert P. Swiatek
Assistant Examiner—Todd E. Manahan
Attorney, Agent, or Firm—Darby & Darby

[57] ABSTRACT

A pet bed comprises a pair of semi-circular cushions connected along their circumferential perimeters to a circular cushion having substantially the same radius as the semi-circular cushions. The opposed diametral edges of the semi-circular cushions are unattached leaving a trough between them. A pocket is formed between the adjacent surfaces of the semi-circular and circular cushions whereby a pet may crawl into the pocket for resting and sleeping or may lie in the trough surrounded on two sides by the diametral edges of the semi-circular cushions.

12 Claims, 2 Drawing Sheets

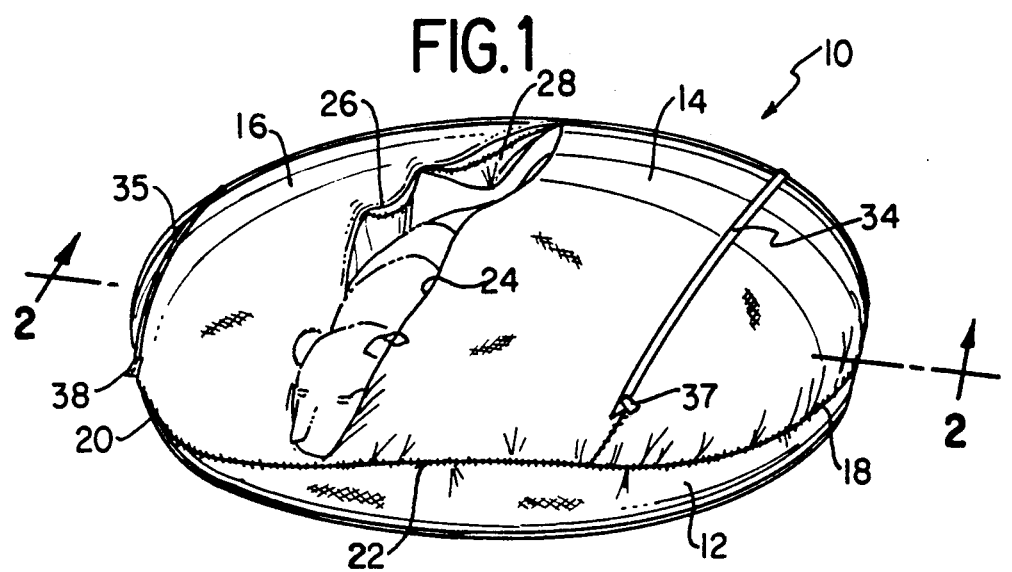
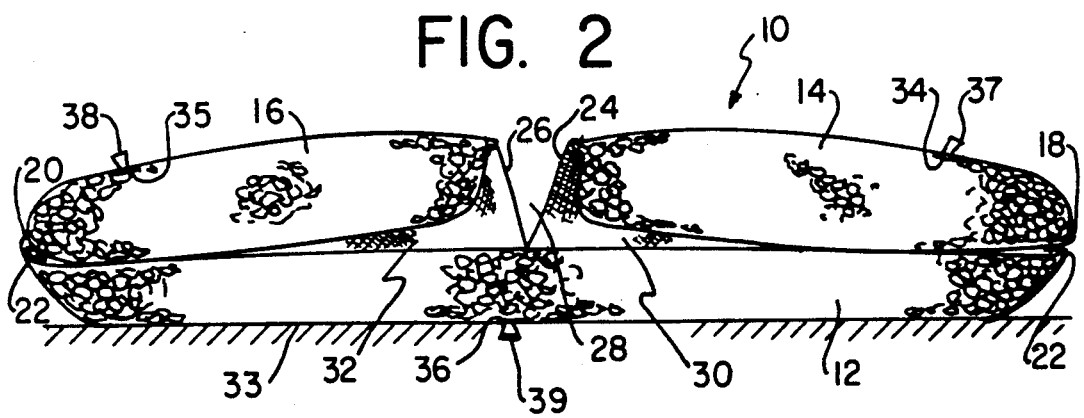

PET BED

FIELD OF THE INVENTION

This invention relates generally to a bed for a pet and more particularly to a combination of cushions providing a number of resting options for the pet.

BACKGROUND OF THE INVENTION

In many instances a household pet is considered as a family member. As such, the pet is deserving of comfortable accommodations, especially for sleeping. A dog bed of the prior art may comprise a lying down surface which is surrounded, with the exception of an entrance opening, with low vertical wall sections. The dog may lie in the center of the bed and frequently the dog attempts to snuggle into the corners of the wall. Dogs seem to have an instinct to withdraw into recesses and trough-like depressions. Cats also seek out environments where they are enclosed or at least partially surrounded, with their head exposed, or sometimes concealed. However, the prior art beds offer the pet few, if any, options in the manner of using the pet bed.

OBJECTS OF THE INVENTION

Accordingly, it is an object of this invention to provide an improved pet bed which gives the pet options for comfortable rest.

Another object of this invention is to provide an improved pet bed which allows for easy cleaning and maintenance.

Yet another object of this invention is to provide an improved pet bed which caters to the instinctive, protective traits of dogs and cats.

In accordance with a preferred embodiment of the invention, a pet bed is provided which is especially suited to accommodate several pet preferences in sleeping and resting. A pair of semi-circular cushions connect along their circumferential perimeters to a circular cushion having substantially the same radius as the semi-circular cushions. The opposed diametral edges of the semi-circular cushions are unattached leaving a trough or slot between them. A pocket is formed between the adjacent surfaces of the semi-circular and circular cushions whereby a pet, for example, a dog or cat, may crawl into the pocket for resting and sleeping or may lie in the trough surrounded on two sides by the diametral edges of the semi-circular cushions. Whether in one of the pockets or in the trough, the animal can keep its head exposed to the ambient air. The cushions are fabricated of a flexible material, for example, cloth covers which may be treated to resist staining. The cushions are filled by opening longitudinal zippers provided in each cushion. The semi-circular cushions are attached to the circular cushion by means of stitching, zippers, snaps, materials that releasably adhere when pressed together, and the like. The seams are turned under to prevent the pet from pulling them apart.

Further objects and advantages of the invention will be apparent from the specification and drawings. The invention accordingly comprises the features of construction, combinations of elements, and arrangement of parts which will be exemplified in the constructions hereinafter set forth and the scope of the invention will be indicated in the appended claims.

BRIEF DESCRIPTION OF THE DRAWINGS

For a fuller understanding of the invention, reference is had to the following description taken in connection with the accompanying drawings, in which:

FIG. 1 is a top perspective view of a pet bed in accordance with the invention;

FIG. 2 is a sectional view taken along the line 2—2 of FIG. 1;

DESCRIPTION OF THE PREFERRED EMBODIMENTS

Figure 3:
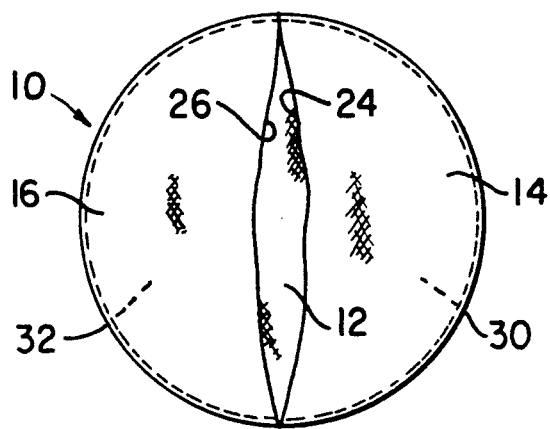
FIG. 3 is a top view of the bed of FIG. 1.

With reference to the figures, a pet bed in accordance with the invention includes a circular base cushion 12 and a pair of semi-circular top cushions 14, 16 which rest upon the base cushion 12. The semi-circular edges 18, 20 of the top cushions are coincident with the circular top edge 22 of the base cushion 12. The circumferential edges 18, 20, 22 are joined together by any suitable means in a permanent or releasable fashion, for example, by stitching, zippers, snaps, hook and loop materials that releasably adhere when pressed together, such as VELCRO (registered trademark of VELCRO Industries, Curacao), and the like, to attach the top cushions to the base cushion.

The diametral edges 24, 26 of the semi-circular cushions 14, 16 are opposed to each other and unattached to the base cushion 12, thereby leaving an opening between the top cushions 14, 16 which is readily and usually inelastically pliable depending upon the filler within the cushions. The edges 24, 26 can be kept close together or partially spread apart to form a generally V-shaped trough 28 or slot.

Because the top cushions 14, 16 are connected to the base cushion 12 only along the outer peripheral edges, pockets 30, 32 exist between the top cushions 14, 16 and the base cushion 12, these pockets extending from the central trough 28 toward the peripheral curved outer edges 18, 20, 22.

The cushions 12, 14, 16 are filled with any suitable cushion material, for example, layers of plastic foam or resilient foam particles, semi-rigid or rigid beading, cloth filler, and the like. To this end, the filler may be contained in its own liner (not shown) which is put into respective covers of the cushions 12, 14, 16 through zipper openings 34, 35, 36, provided in these covers. Thus, the inner filler material may be removed and cleaned as required, and the outer cushion covers may also be cleaned. The cushions, outer surfaces may be any suitable cloth fabric or plastic material and a different covering material may be used for the external surfaces as compared to the inner pocket surfaces. The connections between the top cushions 14, 16 and the base cushion 12 are turned under and the zippers 37, 38, 39 may be concealed to prevent the pets from pulling such joints apart. Also, the base cushion 12, on the surface 33 that contacts the floor or ground, may be of material different from the upper surface of the cushion. The filler material in the base cushion 12 may differ from the filler material in the top cushions 14, 16 to provide different resiliency characteristics, if desired.

In use, a pet can snuggle in the trough 28 as illustrated in FIG. 1; the pet may crawl into either pocket 30, 32, and the pet also may merely lie on top of the semi-circular cushions 14, 16. Thus, the pet has many options in using the pet bed 10 in accordance with this invention.

Cats also find such a device appealing. The cats will lie in the trough 28 or in the pockets 30, 32, or on the top surfaces, just as readily as dogs. Further, the basic size of the bed can be scaled for different dog sizes and for cats.

The outer periphery of the bed need not be limited to a circular shape as illustrated and described, but may be of any shape, for example, square, oval, elliptical, polygonal, etc. The trough 28 need not symmetrically divide the bed. The top cushions, for example, cushions 14, 16, can be complementary segments of the peripheral shape of the base cushion 12, regardless of the base cushion shape, such that the top cushions on opposite sides of the trough are of unequal size. Also, in other alternative embodiments in accordance with the invention, the top cushions need not entirely cover the base cushion, and conversely, the top cushions can extend beyond the edges of the base cushion 12. Also, the base cushion 12 may be replaced merely by a pad (not shown) which does not have removable fillers or a zippered cover. Further, in another alternative embodiment in accordance with the invention, one top cushion may be attached to the base cushion around the entire periphery of the top cushion such that the pet bed in accordance with the invention has only one pocket and a trough.

Nevertheless, in each of these embodiments in accordance with the invention a trough and at least one pocket is provided, with entrance to the pocket from the trough, such that the pet has the option of lying in the trough, crawling and resting at least partially within the pocket, or resting on the top surface of the top cushions.

Further, in alternative embodiments of a pet bed in accordance with the invention, the pockets as shown in FIGS. 1-3 may be omitted. That is, the diametral edges of the top cushions 14, 16 are attached to the base 12. Because the cushions are substantially pliable and inelastic, a trough 28 is still provided between the top cushions 14, 16. However, there are no pockets. In such an embodiment, the options for the pet are reduced to resting in the trough or resting on the top surfaces of the cushions 14, 16.

Figure 4:
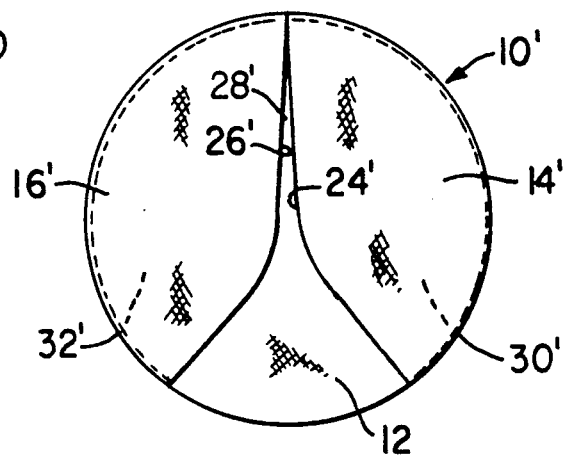
FIGS. 4-6 are top views of alternative embodiments of pet beds in accordance with the invention.
Figure 5:
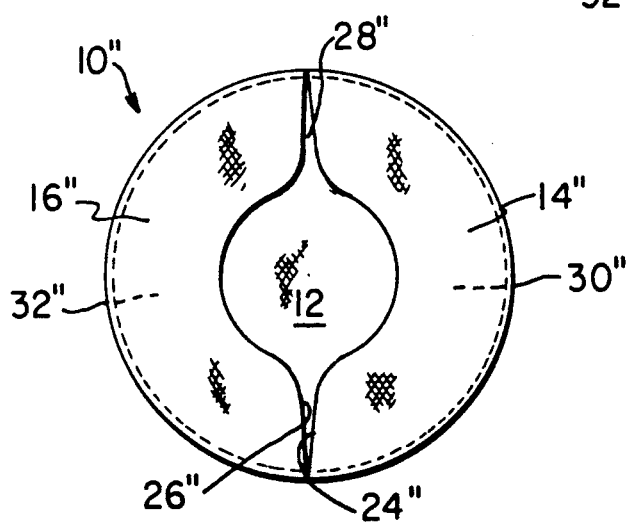

In the bed 10' of FIG. 4 the top cushions 14', 16' are less than semi-circles and the trough 28 between the top cushions flares out at one end of the trough. In FIG. 5, the cushions 14", 16" are contoured so as to provide a basically circular enlargement in the trough 28" at the center of the bed 10".

Figure 6:
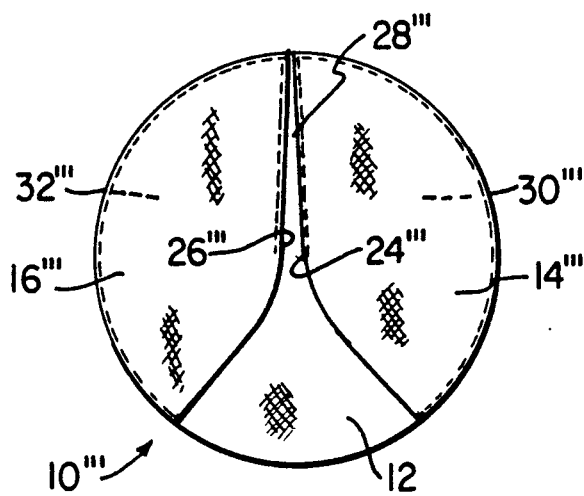

FIG. 6 presents an embodiment of a pet bed 10''' in accordance with the invention which is similar to the embodiment of FIG. 4. However, in FIG. 6 entrance to the pockets 30''', 32''' is only at the flared portion of the trough 28'''.

In FIGS. 4-6, the troughs are shown, for clarity in illustration, without deformations in the top cushion inner edges as would occur when a pet has been lying in the trough.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limited sense. It is also to be understood that the following claims are intended to cover all of the generic and specific features of the invention herein described and all statements of the scope of the invention which might be said to fall therebetween.

What is claimed:

1. A bed for pet comprising:
   a base having a defined area;
   a first top cushion having a first edge around the perimeter thereof, said first cushion being positioned on top of said base and covering a first portion of said base area, said first cushion being attached to said base along a major portion of said first edge, a minor portion of said first edge being unattached to said base, said unattached portion being an entrance to a first pocket formed between said first cushion and said base;
   a second top cushion having a second edge around the perimeter thereof, said second cushion being positioned on top of said base and covering a second portion of said base area, an attachment being formed between said base and the second edge of said second top cushion, the unattached portion of said first top cushion edge being opposed to said second top cushion, a trough being formed between said cushions, said pocket entrance being within said trough.

2. A bed for a pet as claimed in claim 1, wherein said top cushions are attached to said base by at least one of stitching, zippers, snaps and materials that releasably adhere when pressed together.

3. A bed as claimed in claim 1, wherein a minor portion of the second edge of said second cushion is unattached to said base, said unattached portion of said second edge being an entrance to a second pocket formed between said second cushion and said base, and the unattached edge portions of said top cushions being opposed to each other, such that the entrance to said second pocket is within said trough.

4. A bed as claimed in claim 3, wherein said base is circular and said top cushions are each semi-circular, the diametral portions of said semi-circular cushions being opposed to each other and forming said trough therebetween.

5. A bed as claimed in claim 4, wherein said base is a cushion.

6. A bed as claimed in claim 5, wherein said base and top cushions each include a cover having an opening therethrough and filler therein, and reversible closure means in each cushion for controlling said opening, said filler being removable and insertable into said cushion via said opening.

7. A bed as claimed in claim 6, wherein said closure means is concealed from said pet.

8. A bed as claimed in claim 1, wherein said base is circular and said top cushions are each semi-circular, the diametral portions of said semi-circular cushions being opposed to each other and forming said trough therebetween.

9. A bed as claimed in claim 1, wherein said base is a cushion.

10. A bed as claimed in claim 1, wherein said trough has two ends, said trough being narrow at one end and flared at the other end.

11. A bed as claimed in claim 10, wherein said pocket entrance is at said flared end of said trough.

12. A bed as claimed in claim 1, wherein said trough has two ends, said trough being narrow at both ends and wider for at lest a portion of the trough length between said two ends.

* * * * *